US005825838A

United States Patent [19]
Park et al.

[11] Patent Number: 5,825,838
[45] Date of Patent: *Oct. 20, 1998

[54] REACTOR FLOODING SYSTEM FOR A RETAINING MOLTEN CORE MATERIALS IN A REACTOR VESSEL BY THE IMPROVED EXTERNAL VESSEL COOLING CAPABILITY

[75] Inventors: Jae-Hong Park; Jong-In Lee, both of Daejeon-Si, Rep. of Korea

[73] Assignee: Korea Institute Of Nuclear Safety, Daejeon-Si, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 622,785

[22] Filed: Mar. 27, 1996

[30] Foreign Application Priority Data

Aug. 8, 1995 [KR]  Rep. of Korea ................. 1995 24373

[51] Int. Cl.$^6$ ...................................................... G21C 9/00
[52] U.S. Cl. ........................... 376/299; 376/280; 376/282
[58] Field of Search .................................. 376/283, 282, 376/280, 299, 298

[56] References Cited

U.S. PATENT DOCUMENTS 3,168,445  2/1965  Ziegler et al. ............................ 176/38
5,319,687  6/1994  Henry ...................................... 376/299

OTHER PUBLICATIONS

"Advanced Light Water Reactor Utility Requirements Documents", EPRI, vol. II, pp. 5.6–46, Dec. 1995.
Advanced Light Water Reactor Utility Requirements Documents, EPRI, vol. III, pp. 5.6–53, Jun. 1990.
"U.S. Nuclear Regulatory Commission 1995 Annual Report", U.S.N.R.C., pp. 197–198, 1995.
"In–Vessel Core Debris Cooling Through External Flooding of the Reactor Pressure Vessel", Okkonen et al., NEA/DSNI/R(94)6, Feb. 1994.

"In–Vessel Coolability and Retention of a Core Melt", Theofanous et al., DOE/ID 10460, vol. I, Jul. 1995, pp. (2–1)–(2–6), (3–5)–(3–7), (K–3)–(K–15), (M–3)–(M–16).

"Confirmation Testing of The Flooded Cavity Design for In–Vessel Core Retention in the Cybl Facility", Chu et al., CSARP Semiannual Review Meeting, Bethesda, Maryland, May 2–6, 1994 (un–numbered pages).

(List continued on next page.)

Primary Examiner—Harvey E. Behrend
Attorney, Agent, or Firm—Nikaido Marmelstein Murray & Oram LLP

[57] ABSTRACT

A reactor cavity flooding system, which is used to immerse the hemispherical lower head of a nuclear reactor vessel by flooding the reactor cavity, is connected to both coolant injection nozzles located at the annulus gap between the lower head and the thermal insulator of a reactor and the discharge loops which are used to drain the hot water of the annulus gap into either the cavity floor or a liquid eductor. The subcooled water at a fire protection system can be directly injected into the annulus gap through twenty-five (25) nozzles at the lowest, middle, and top injection headers by a pump. The hot water heated at the lower head will be drained into either the cavity floor and/or the liquid eductor via two discharge loops that consist of both a suction header in the annulus gap at the equator level of the lower head and four (4) leakage collectors at the outside of four (4) shear keys of a reactor vessel. Drainage and recirculation of the hot water can be achieved in two ways. The first way uses the pump for injecting the subcooled water and for recirculating the drained water in a reactor cavity. The second way uses a liquid eductor for draining the hot water, instead of discharging it into the reactor cavity floor, and a pump for recirculating the drained water blended with subcooled water through the liquid eductor.

15 Claims, 5 Drawing Sheets

OTHER PUBLICATIONS

"Determination of Boiling Curves on a Downward Facing Hemisphere Surface"; Cheung, Cooperative Severe Accident Research Program (CSARP) Semiannual Review Meeting, Bethesda Maryland.U.S.A., May 1994 (un–numbered pages).

"External Cooling of a Reactor Vessel under Severe Accident Conditions", Henry et al., Nuclear Engineering and Design 139(1993) 31–43.

"Effect of Outside Cooling on the Termal Behavior of a PWR Vessel Lower Head", Park et al., Nuclear Technology vol. 100, pp. 331–346, Dec. 1992.

REACTOR FLOODING SYSTEM FOR A RETAINING MOLTEN CORE MATERIALS IN A REACTOR VESSEL BY THE IMPROVED EXTERNAL VESSEL COOLING CAPABILITY

BACKGROUND OF THE INVENTION

A severe accident in nuclear power plants may lead to core damage from reactor vessel melt-through by the molten core materials (core debris) contained in the lower head of a reactor vessel if the core debris is not adequately cooled. One of the accident management concepts currently being investigated by several countries for light water reactors (LWRs) is to cool the outside of a reactor vessel by immersing the vessel through flooding either the reactor cavity of a pressurized water reactor (PWR) or the drywell of a boiling water reactor (BWR). This will remove the fission product decay heat of the core debris from the outside of the vessel wall and prevent vessel melt-through by the molten core debris following a severe accident. Currently these ex-vessel cooling concepts and related thermal-hydraulics are under investigation by several universities and institutions including the Nuclear Regulatory Commission (NRC), Electric Power Research Institution (EPRI), Sandia National Laboratory, Westinghouse (for AP-600 design) in U.S. and OECD.

Success of this accident management concept depends on accommodating the heat fluxes imposed internally (on the core melt side) either by the upper structures of a reactor vessel or the steam generators while maintaining the nucleate boiling heat transfer on the vessel outside wall. Thus, the effectiveness of the ex-vessel boiling process is important to the flooded reactor cavity concept in dissipating decay heat imposed by the molten core on the bottom of the reactor vessel. The ex-vessel boiling process is unique in that boiling takes place outside of a large downward-facing curved surface. Because of the upside-down geometry and a number of incore detector lines, the vapor generated during boiling cannot readily rise away from the heating surface, rather it must flow along the surface to the edge of the surface before it is released into the bulk liquid, or squeezed upon the heating surface by gravitational forces.

Also, the ex-vessel cooling concept has several open issues such as (1) whether the supplied coolant will maintain the subcooled state even though heat transfer is excessively large at the ex-vessel lower head, (2) whether the thermal insulator of the reactor vessel will not hinder the water ingression into the annulus gap between the reactor and the thermal insulator, (3) whether the thermal insulator will collapse onto the reactor vessel wall by the water head, and thus result in a hot spot at which water cannot reach the vessel wall, and (4) whether the bubbles generated by heat transfer at the lower head will escape outside of the thermal insulator and therefore not reduce the cooling effects.

In Korea, some part of this concept (only the provision of the necessary piping system up to the entrance of a reactor cavity preparing against the future installation of a reactor cavity flooding system) are under reviewed in the Ul-Chin Nuclear Unit 3 & 4 (UCN 3&4) which are PWR 1000 MWe designed by ABB-CE and under construction currently. The reactor cavity of the UCN 3&4 is designed to allow water trap up to an elevation slightly above an equator level of a hemispherical lower head, both through the actuation of the containment spray pumps and the break flow of the reactor coolant at the postulated loss of coolant accident (LOCA). The water source of UCN 3 & 4 for the future reactor cavity flooding system is the fire protection system. The design requirement of the reactor cavity flooding system for UCN 3&4 specifies that the pumping capacity should be about 150 $m^3$/hr. The free volume of the reactor cavity is about 370 $m^3$ up to the equator level of the lower head. Thus, it may take about 2 hours and 30 minutes to flood up to the equator level of a reactor lower head. Some analyses estimated that the time of vessel failure ranges from slightly under one hour for large break LOCA sequences to three hours or more for station blackout sequences in a large PWR. If these accident scenarios are applied to the UCN 3&4, there are about 30 minutes or less time left for the operator to actuate the cavity flooding system.

The current ex-vessel cooling concept of the reactor cavity flooding system, which are investigated by the several institutions, is submerging a reactor vessel by flooding the reactor cavity which has a large free volume. For the reactor cavity flooding system of the UCN 3&4 that is based on the current concept of reactor cavity flooding, it is expected that the grace period for the plant operator to decide whether to actuate the cavity flooding system is about 30 minutes or less. Also, the thermal insulator of the UCN 3&4 reactor vessel will hinder the ex-vessel cooling because the water ingression through the thermal insulator and the continuous supply of a sufficient amount of subcooled water are not easy. Moreover, the free volume of the annulus gap between the reactor vessel and the thermal insulator is small. Therefore, it is expected that the circulation of the ingressed water may be difficult and that the amount of the ingressed water will not be enough to maintain the subcooled condition.

Thus, it is anticipated that the current concept of a reactor cavity flooding system may be very difficult to be applied to the UCN 3&4 for the ex-vessel cooling purpose, unless a significantly improved vessel flooding method becomes available.

SUMMARY OF THE INVENTION

The current concept of a reactor cavity flooding system is to immerse the outside of the nuclear reactor vessel by flooding the reactor cavity, and it is an accident management concept currently investigated by several countries to remove the fission product decay heat of the core debris from the outside vessel wall and maintain the vessel integrity following a severe accident. In Korea, some part of this concept (only the provision of the necessary piping system up to the reactor cavity entrance for the future installation of a reactor cavity flooding system) are considered in the Ul-Chin Nuclear Unit 3&4 (UCN 3&4) design.

It is the object of the invention to connect the reactor cavity flooding system to both the coolant injection nozzles located at the annulus gap between the lower head and the thermal insulator of a reactor and the discharge loops which are used to drain the hot water of the annulus gap into either the cavity floor or the liquid eductor suction. This will increase the plant operator's decision time for actuating this system and will assist in retaining the molten core materials in a reactor vessel by the improved external vessel cooling capability. This system of the invention will promote flooding the lower head of a reactor and discharging the heated water from the reactor thermal insulator.

The subcooled water of a fire protection system, located at the outside of the containment building, can be directly injected into the annulus gap through twenty-five (25) nozzles at the lowest, middle, and top injection headers by a pump. The hot water heated at the lower head will be drained into either the cavity floor and/or the liquid eductor suction via two discharge loops that consist of both a suction header in the annulus gap above the equator level of the lower head and four (4) leakage collectors at the outside of four (4) shear keys of a reactor vessel. Drain and recirculation of the hot water can be achieved by two options of the invention. The first option uses the pump for injecting the subcooled water and for recirculating the drained water at a reactor cavity into the injection headers. The second option uses a liquid eductor for draining the hot water instead of discharging it into the reactor cavity floor and two pumps for recirculating the drained water blended with the subcooled water through the liquid eductor into the injection headers.

The lowest injection header is located at the annulus gap between the bottom of the spherical reactor's lower head and the thermal insulator. Fire injection nozzles are installed at the lowest injection header and the directions of the injection flow are vertical. The middle injection header is located at the annulus gap between the four (4) shear keys of a reactor lower head and the thermal insulator. Twelve (12) injection nozzles are installed at the middle injection header and the directions of the injection flow are vertical. The top injection header is located at the annulus gap between the equator level of the lower head and the thermal insulator. Eight (8) injection nozzles are installed at the top injection header and the directions of the injection flow are horizontal to the cylindrical reactor wall.

Two, upper and lower, discharge loops are installed to drain the hot water heated from the outside of the lower head into either the cavity floor or the suction of the liquid eductor. The upper discharge loop is the suction header located above the lower head equator level. Forty (40) suction holes are installed at the suction header. The lower discharge loop is located at the outside of the thermal insulator opening at the four (4) shear keys of a reactor lower head. Four (4) water leakage collectors of stainless steel are provided at the lower discharge loop. Drainage of the hot water will promote the cold water injection and circulation at the annulus gap of the lower head and increases the ex-vessel cooling effect.

Drainage and recirculation of the hot water can be achieved by two options of the invention. The first option uses the pump for injecting the subcooled water and for recirculating the drained water at a reactor cavity into the injection headers. In the first option, the flooding of a reactor vessel is divided into an injection mode and a recirculation mode. In the injection mode, the fire protection system is used as the water source for flooding the lower head of the reactor vessel by two pumps. The hot water will be drained into the reactor cavity floor by gravity via the two discharge loops. During the recirculation mode, the pool water of a reactor cavity is used for vessel flooding. If the cavity water level has been sufficiently increased and pool water has been cooled down by natural heat transfer with the cavity concrete floor and wall, the plant operator can arrange the valve lineup. A pump is used to recirculate the hot water by converting the water source from the fire protection system to the cavity water pool during the recirculation mode for long term vessel cooling. The second option uses a liquid eductor or liquid jet pump for draining the hot water instead of discharging it into the reactor cavity floor and two pumps for recirculating the drained water blended with the subcooled water through the liquid eductor into the injection headers. The hot water is drained into the eductor suction by the driving force of the pump and mixed with the motive fluid that is the subcooled water from the fire protection system. Then, the mixed coolant is recirculated into the annulus gap of the lower head through the liquid eductor by the two pumps.

The free volume of a reactor flooding system piping is much smaller than that of a reactor cavity. Therefore, reactor vessel flooding will be performed within a very short time. Thus, this system according to the invention will significantly reduce the flooding time of the lower head external wall by the direct vessel injection compared with the lower head immersing via the reactor cavity flooding. Therefore, the grace period for the plant operator to evaluate the accident sequence and decide the actuation of this system will be increased. Also, the lower head flooding is not hindered by the vessel insulator because the injection nozzles are located in the annulus gap between the spherical reactor lower head and the thermal insulator. Drainage of the hot water via two discharge loops according to the invention will promote the cold water injection and circulation in the annulus gap of the lower head and increases the external vessel cooling effect. It is expected that this system will significantly increase the external cooling capability for a reactor vessel compare with the current concept of a reactor cavity flooding system and will assist to maintain the reactor vessel integrity by retaining the molten core materials in a vessel during a severe accident.

BRIEF DESCRIPTION OF THE DRAWING

FIG. 1 is the use of both the liquid eductor and pump for the draining and recirculation of hot water instead of pumping the reactor cavity pool water.

FIGS. 3-1 and 3-2 are the schematic diagrams illustrating the lowest, middle and top injection headers and the twenty-five (25) injection nozzles with the protective screens according to invention.

FIGS. 5 and 5-1 are the schematic diagrams illustrating the four (4) water leakage collectors at the shear key regions of the reactor lower head.

DETAILED DESCRIPTION OF THE PREFERRED EMBODIMENTS

Figure 1:
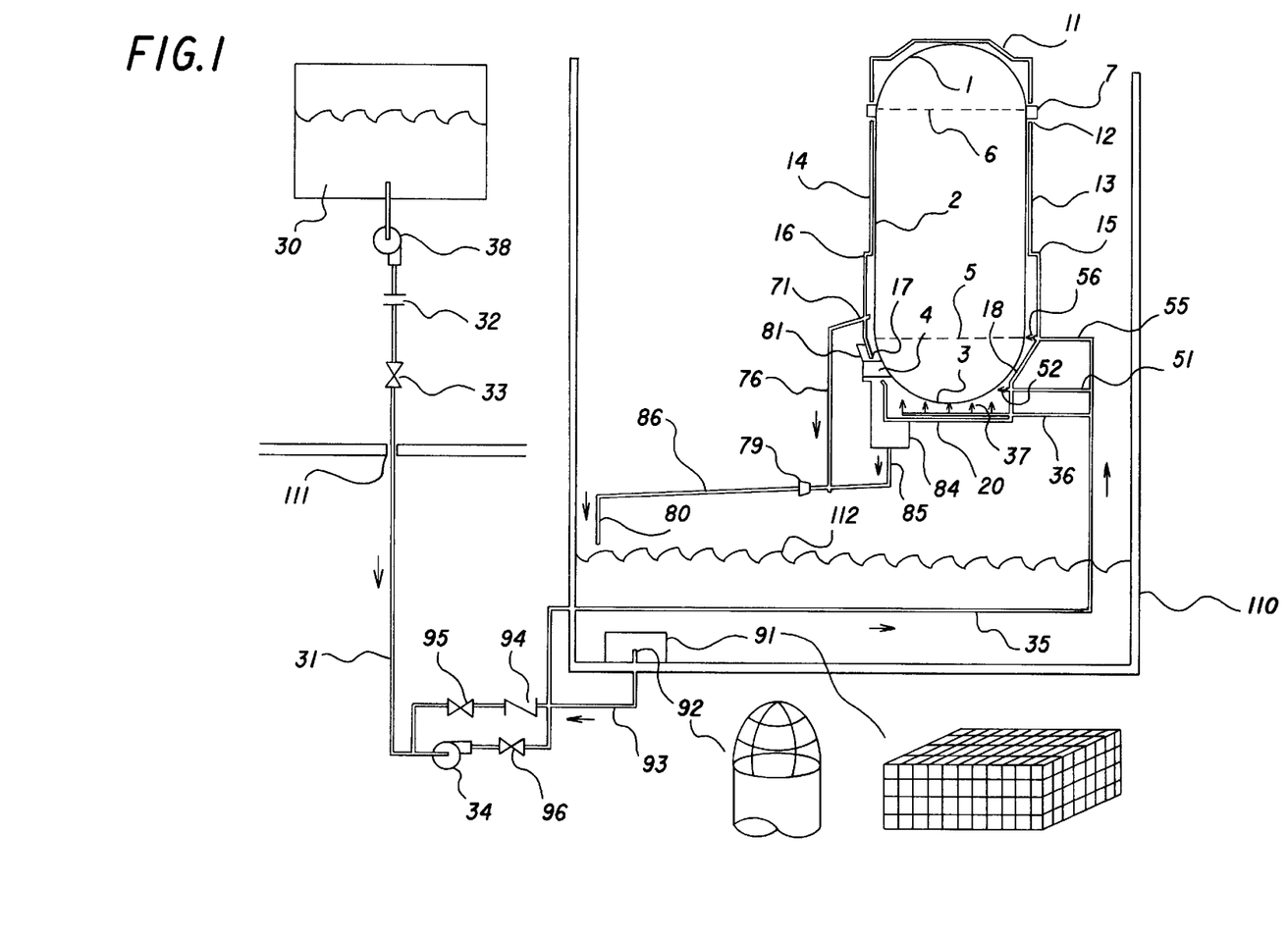
FIG. 1 is a schematic diagram illustrating the reactor vessel flooding system with the three (3) injection headers and injection nozzles and two (2) draining loops according to the invention for the injection and recirculation operation modes. The vortex suppressor and debris screen are installed for the pump protection for recirculating the pool water of a reactor cavity during a recirculation operation.

In FIG. 1, the reactor flooding system according to the invention is illustrated schematically with a PWR type reactor vessel and its thermal insulator. This system is based on the design of the Ul-Chin Nuclear Unit 3&4 (UCN 3&4) which are PWR 1000 MWe designed by ABB-CE and under construction currently, but it will be applicable to other types of PWR or BWR plants with some modifications. The reactor cavity flooding system of the UCN 3&4 is to immerse the outside of the nuclear reactor vessel by flooding the reactor cavity. The cavity flooding concept of UCN 3&4 is different from that of this invention. This invention directly floods the reactor lower head by cold water injection via the injection nozzles without the interruption of the thermal insulation. The conceptual design of UCN 3&4 system is only the provision of the necessary piping system up to the entrance of a reactor cavity in order to prepare for the future installation of a reactor cavity flooding system which is under review in the UCN 3&4 design. The main object of this invention is to resolve the thermal insulator problems for flooding and cooling a reactor vessel during severe accident scenarios because the thermal insulator may present difficulties related to the water ingression and steam or vapor relief.

Figure 2:
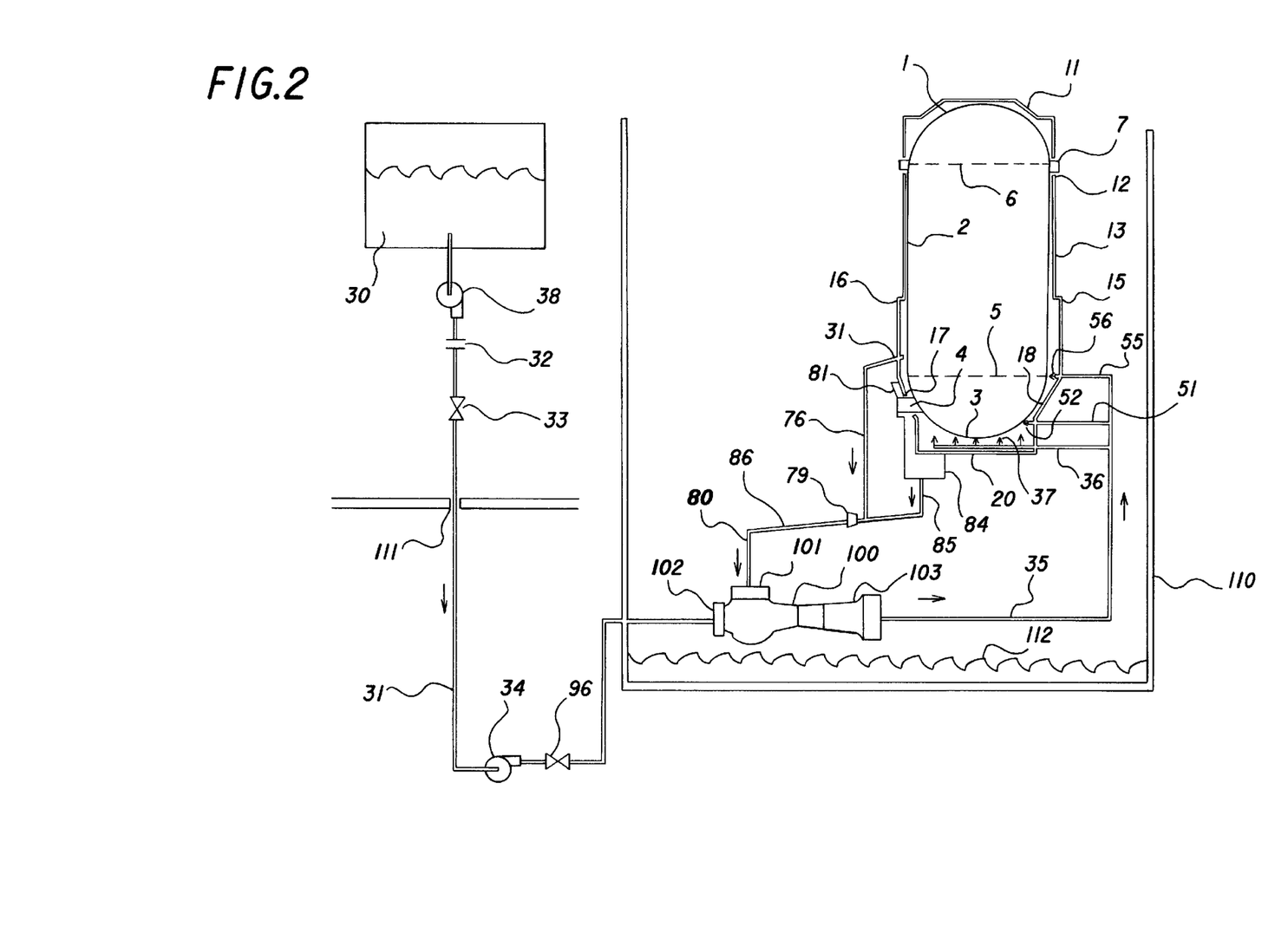
FIG. 2 is a schematic diagram illustrating the reactor vessel flooding system with the three (3) injection headers and injection nozzles and two (2) draining loops according to invention. The difference between FIG. 2
Figure 3A:
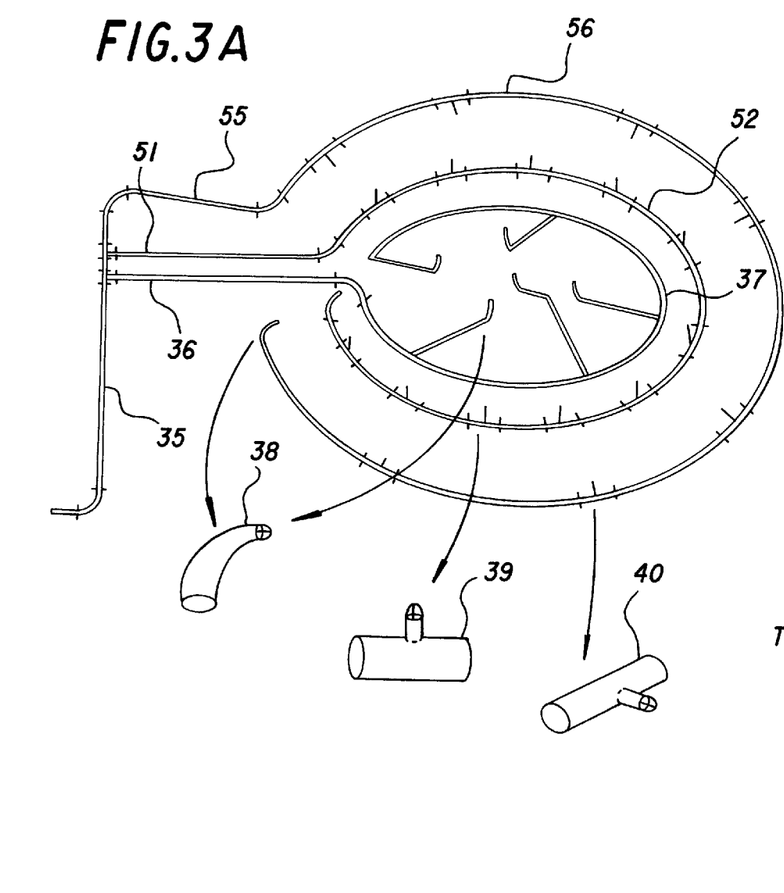
Figure 3B:
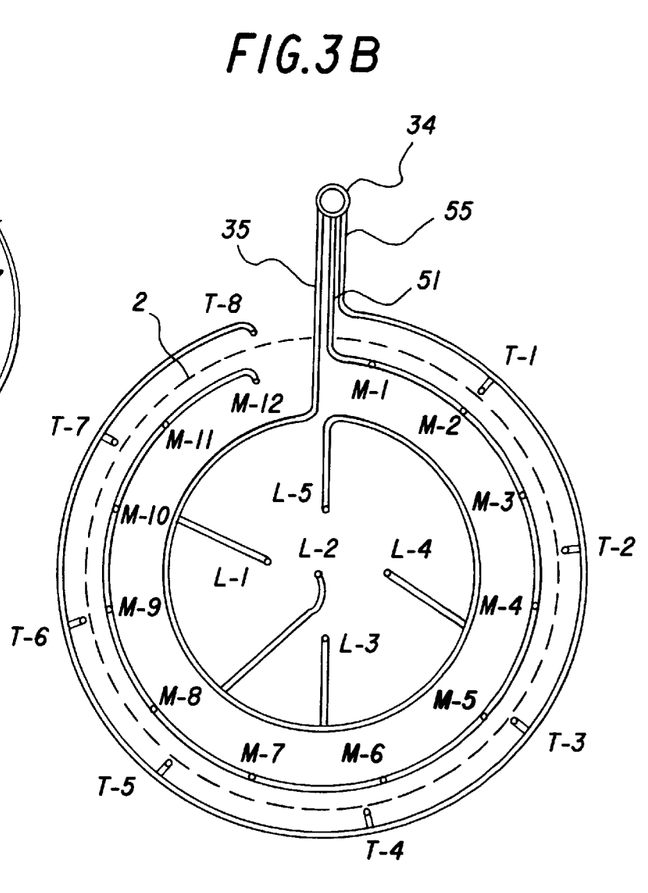
Figure 5A:
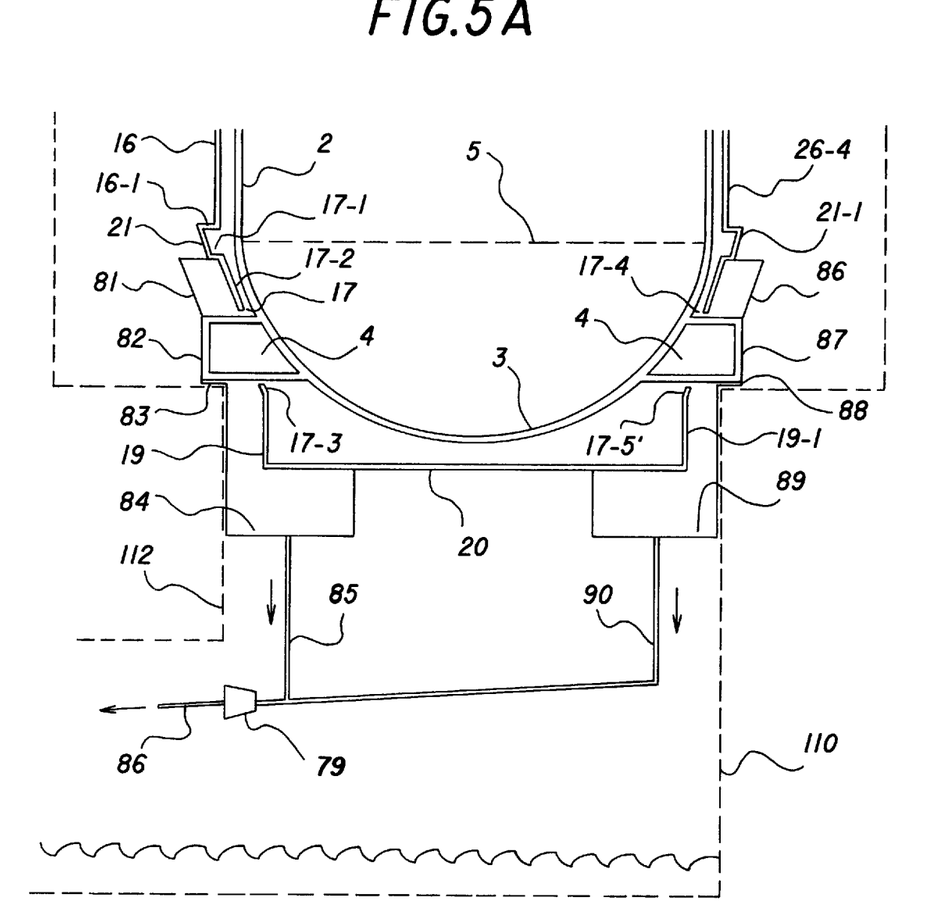
Figure 5B:
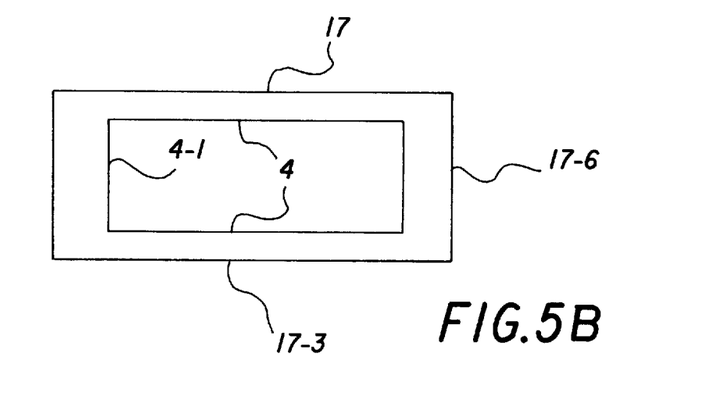

First, the thermal insulator design of the UCN 3&4 reactor vessel will be described before the detailed description of the invention. The thermal insulator of the UCN 3&4 reactor vessel is designed as follows: The thermal insulator plates, which are composed of many thin stainless steel plates, enclose the reactor vessel with the overall thickness of 4½% inches (=4½":11.43 cm). The UCN 3 reactor has four (4) shear keys 4 which are located above the middle of a reactor lower head 3 as indicated at the left side of a reactor vessel 1 in FIG. 1. The thermal insulator does not enclosed the shear keys. The insulator design 17 at these regions is different in shape and thickness from the insulator design 18 at the other side of a reactor lower head 3 where the shear key is not present. The thickness of the thermal insulator at these shear key regions is 1⅜" (3.4925 cm). FIGS. 1, 2 and 5 illustrate schematically the shape of the insulator design at these regions. In FIG. 5, the insulator thickness of plate 16, 16-1, 21, 19 and 20 is 4½". The insulator thickness of plate 17-1, 17-2, 17 and 17-3 at the shear key region is 1⅜. The only open spaces for the water ingression at the hemispherical lower head from the reactor cavity are the four (4) vessel shear key regions. The cross sectional dimensions of the shear key 4 and thermal insulator opening 17 and 17-1 at the shear key are 21"×8" (53.34 cm×20.32 cm) and 24½"×10" (62.23 cm×25.4 cm), respectively. The opening area of the thermal insulator around each shear key is 77 in² (=0.53472 ft²: 496.77 cm²=0.049677 m²) shown as the shaded area per a shear key in FIG. 5-1. Thus, the total opening area around the four (4) shear keys is 2.1389 ft² (0.19871 m²). Thus, the conventional reactor cavity flooding system can supply water coolant to the lower head through these shear key openings.

In FIG. 1, the maximum water level by flooding would be about 2.547 ft (0.776 m) above the equator level 5 of a lower head 3 because the overflow will be discharged to the emergency sump at this level. It is expected that the water vapor generated by heatup at the lower head will not sufficiently escape from the annulus space between the reactor vessel 2 and the thermal insulator 15 and 16 because the vapor exit 12 which is ½" (1.27 cm) opening around the bottom of the hemispherical upper head mating surface 7, is located about 32 ft. (9.75 m) above the equator level 5 or about 29 ft. (8.9 m) above the maximum water level.

Figure 4:
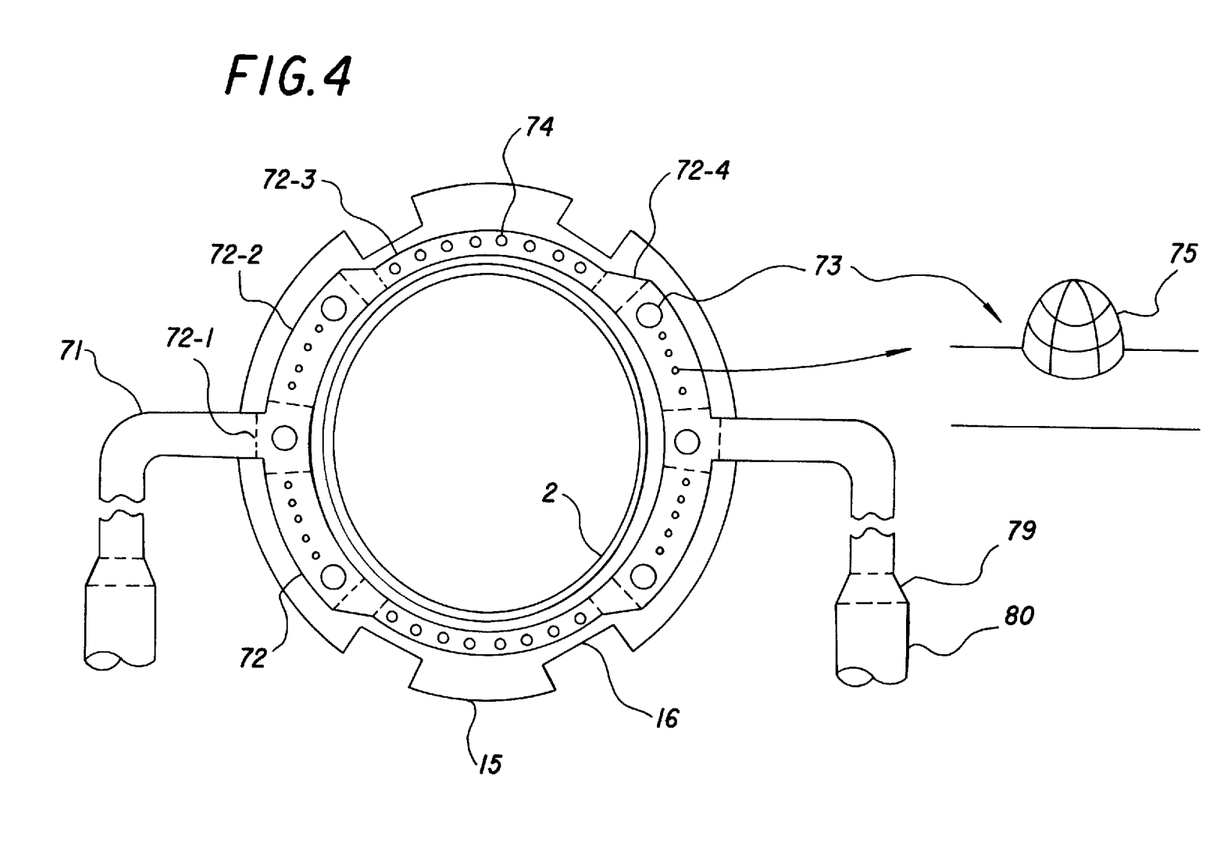
FIG. 4 is a schematic diagram illustrating the suction header and forty (40) suction holes with the protective screens for the drainage of the hot water from the annulus gap between the lower part of the cylindrical reactor vessel and the thermal insulator according to invention.

In FIGS. 1 and 2, the minimum size of the annulus gap between the reactor vessel lower head 3 and the horizontal thermal insulator 20 is 1.25" (3.175 cm) at the bottom center of the hemispherical lower head. FIG. 4 schematically shows the shapes of the annulus gap between the cylindrical vessel wall 2 and the thermal insulators 15 and 16. As illustrated schematically in FIGS. 1, 2 and 4, the variation in size of the annulus gap from the equator level 5 up to the elevations 15 and 16, which are about 5.2 feet (1.58 m) below the center of a hot leg nozzle, not shown in FIGS. 1 and 2, are 2.785" (7.1 cm) at insulator 16 which is above the shear key and 8.54" (21.68 cm) at insulator 15 which does not include the shear key, respectively. The size of the annulus gap 13 and 14 is ½" (1.27 cm) around the cylindrical vessel wall 2 from the elevations 15 and 16 up to the bottom of the hemispherical upper head mating surface 7. Vapor generated by boiling at the annulus gap of a lower head 3 will escape into the reactor cavity through both the ½" annulus gaps 13 and 14 and the ½" opening 12 in FIGS. 1 and 2.

The reactor flooding system according to the invention is now described based on the thermal insulator design of the UCN 3 and 4 reactor vessel. The piping of this system is based on the Schedule 40 pipe in the following description. Also, the piping size is the nominal diameter if there is no other description. In FIGS. 1 and 2, the subcooled water, in a fresh water tank 30 of a fire protection system located outside the containment building 111, can be directly injected into the annulus gap through twenty-five (25) nozzles at the lowest, middle, and top inlet headers 36, 51 and 55 by pumps 38 and 34. The fresh water tank 30 of the fire protection system is connected to the pump 34 of the reactor flooding system via the fire protection pump 38, piping 31, flanged connection 32, and valve 33. The capacities of the pump 34 and 38 are the same. The pumps 34 and 38 have a flow rate or 360.6 m³/hr (1586.6 gpm), a water head of 100 m (328 ft), a speed of 1785 rpm, and an efficiency of 79.5%. The maximum flow rate of these pumps is 520 m³/hr (2288 gpm) at 80 m (262.5 ft) head. The valve 96 is used to control the flow rate of the pumps.

The dedicated containment penetration 111 for the reactor flooding system is installed at the UCN 3 and 4 plants. The diameters of the inlet piping 31 and outlet piping 35 of the pump 34 are 6". The 6" pipe 35 is branched to the inlet header pipings 36, 51 and 55 with a 4" diameter via reduced tees which have the inlet size of 6" diameter with the outlet size of 4" (6"×6"×4") and a 90° reducing elbow with along radius, respectively, as shown in FIGS. 1, 2, 3-1 and 3-2.

In FIG. 3-1 and 3-2, the inlet header pipings 36, 51 and 55 with the 4" diameter are connected with the lowest, middle and top injection headers 37, 52 and 56 with the same diameter. These injection headers are equipped with antivibration supports which are not shown in the figures. The supports will tightly hold the injection headers so that the existing reactor equipment such as the forty-five (45) incore instrument lines, not shown in the figures, and the thermal insulator are not impaired by the flow induced vibration during water injection. Four (4) steel beams are installed as the support structures at the bottom of the horizontal part of the lower head thermal insulator 20, so the thermal insulator may not be disturbed when the annulus gap at the lower head 3 is flooded by this system, as illustrated in FIGS. 1 and 2. The radius of the lowest and middle injection headers are about 1.7 m and 1.9 m, respectively. The lowest injection header 37 is located at the bottom of the lower head 3. Five (5) injection nozzles are routed between the forty-five (45) incore instrument lines and tightly fastened by the supports. The distance between these instrument lines is about 21 cm (8.27") both breadthwise and lengthwise. The middle injection header 52 is located below the four (4) shear keys of the reactor lower head. These injection headers sufficiently encircle the forty-five (45) incore instrument lines. Therefore, these instrument lines will not be disturbed during water injection. The top injection header 56 is located at the equator level 5 as shown in FIGS. 1 and 2.

A total of 25 injection nozzles are installed at the three (3) injection headers 37, 52 and 56 and are equipped with protective screens for preventing debris from plugging the nozzles as shown in FIG. 3-1. The lowest header 37 has five (5) injection nozzles L-1, L-2, L-3, L-4 and L-5. The 90° reducing elbows with long radius of 1½" outlet diameter are used as the injection nozzles. The flow directions are vertical from these nozzles as shown in FIGS. 3-1 and 3-2. The middle injection header 52 has twelve (12) injection nozzles M-1 through M-12. The top injection header 56 has eight (8) injection nozzles T-1 through T-8. The flow directions are vertical at the nozzles M-1 through M-12 of a middle injection header 52 and horizontal at the nozzles T-1 through T-8 of a top injection header 56. The reducing tees of the 4" diameter with the outlet diameter of 1½" (4"×4"×1½") are used as the injection nozzles at the middle and top injection headers. Two 90° reducing elbows with the long radius of 1½" outlet diameter are used as injection nozzles M-12 and T-8 at the middle and top injection header.

Two, upper and lower, discharge loops 71 and 84 according to the invention are provided to drain the hot water heated from the lower head 3 as illustrated in FIGS. 1 and 2. FIGS. 4 and 5 show these discharge loops in detail. In FIG. 4, with the 4" tee 72-1, the suction pipe 71 of an upper discharge loop is connected to the discharge or suction header 72 which consists of the different size pipes 72-2 and 72-3 of 4" and 1½". These different size pipes are coupled together by welding with the eccentric reducers 72-4 of 4"×1½" dimension. The nominal outside diameters of these 4" and 1½" pipes are 4.5" (11.43 cm) and 1.9" (4.826 cm), respectively. Upper discharge loop 71 is located at the lower head equator level. The annulus gap sizes between the thermal insulators and the cylindrical vessel wall 2 are 8.535" (21.6789 cm) for insulators 15 and 2.785" (7.074 cm) for insulators 16, respectively. Therefore, the suction header 72 can be sufficiently located between the annulus gap without any disturbance to the insulator. Twenty-four (24) suction holes 73, each 6 cm in diameter, are installed at the 4" diameter pipes 72-2 which has the nominal inside diameter of 4.026" (10.226 cm). Sixteen (16) suction holes 74 with 2.5 cm diameter are installed at the 1½" diameter pipes 72-3 which has the nominal inside diameter of 1.61" (4.0894 cm). The 6 cm diameter holes are represented schematically as small dots because of insufficient space in FIG. 4. These forty (40) suction holes are equipped with the protective screens 75 in order to prevent plugging by debris.

The lower discharge loop 84 of stainless steel is the water leakage collector. The thermal insulator at the reactor vessel lower shear key does not enclose the shear key as described above. The opening areas of thermal insulator around the shear keys are 0.53472 ft$^2$ (0.049677 m$^2$) per shear key, schematically shown as the shaded area in FIG. 5-1, and 2.1389 ft$^2$ (0.19871 m$^2$) per four (4) shear keys, respectively. It is expected that most of the injected water coolant at the bottom of a lower head will leak out through these opening gaps. Four (4) water leakage collectors are provided to retrieve and recirculate this leakage at the four (4) shear key regions as illustrated schematically in FIGS. 1, 2 and 5.

The drain piping 86 is sloped toward the discharge point 80 to promote drainage by gravity. Draining and recirculation of the hot water can be achieved by two options according to the invention. In the first option as illustrated in FIG. 1, the flooding of a reactor vessel can be carried out by two operational modes, i.e., the injection and recirculation modes. At the injection mode, a fresh water tank 30 of the fire protection system is used as the water source for flooding the lower head of a reactor vessel by two pumps 34 and 38. The hot water will be drained into the reactor cavity floor 110 by gravity via the two discharge loops 71 and 84. During the recirculation mode, the pool water of the reactor cavity is used for the vessel flooding. A water level gauge and a temperature gauge are provided at the reactor cavity 110 although these are not shown in FIG. 1. If the cavity water level has sufficiently increased and the water pool has cooled down by natural heat transfer with the cavity concrete floor and wall, the plant operator can arrange the valve lineup, that is, to close valve 33 and to open valve 95. The pump 34 is used to recirculate the hot water by converting the water source from the fresh water tank 30 to the cavity water pool 112 during the recirculation mode for long term vessel cooling via the suction piping 93, check valve 94, valve 95, pump 34, valve 96, and outlet piping 35. The vortex suppressor 91 is provided to reduce air ingestion effects for the pump 34 to almost zero. The shape of the vortex suppressor is a standard cubic arrangement of 1½" (3.81 cm) deep or deeper floor grating with the height, length, and width of greater than or equal to 19.9" (50.55 cm) as described in the Regulatory Guide 1.82, revision 1 of the US Nuclear Regulatory Commission (NRC). The top of cube 91 should be submerged in the water pool 112 at least 6" (15.3 cm) in height during the recirculation from the cavity. Thus, the recirculation from the cavity pool 112 will be allowed if the water pool depth above the top of the cube is greater than or equal to 6" (15.3 cm) in height. A protective screen 92 is installed at the inlet of the pump suction piping 93 in order to prevent plugging by debris.

The second option, as illustrated schematically in FIG. 2, uses two pumps 34 and 38 for injection of water and the liquid eductor 100 for draining and recirculating the hot water instead of discharging it into the reactor cavity floor 110. The difference for the second option, FIG. 2, from the first option, FIG. 1, is the use of both the liquid eductor and pumps for draining and recirculating the hot water instead of pumping the pool water from the reactor cavity. A liquid eductor or liquid jet pump 100 of the nominal diameter of 6" is installed in the 6" piping 35. The hot water will be drained into the eductor suction 101 by the driving force of the two pumps 34 and 38 and mixed with the subcooled water of the fresh water tank 30 in the diffuser region 100 and 103 of the eductor. Thus, the two pumps 34 and 38 are used to drain and recirculate the hot water through the liquid eductor and inject the mixed coolant into the annulus gap of the lower head in a second option of the invention.

The advantages of the present invention are: (1) the continuous and direct injection of the relatively cold water into the inside of the annulus gap between the hemispherical lower head of a reactor and the thermal insulator, (2) the continuous drainage of the hot water both from the annulus gap above the equator level of the reactor lower head and from the insulator openings at the four (4) shear keys of the lower head in order to promote the cold water ingression and circulation in the annulus gap and to increase the external vessel cooling effect, (3) a resolution of the thermal insulator problem which may hinder the water flooding and drainage into and from the annulus gap, (4) no interruption with the existing design of the reactor, such as the thermal insulator and the forty-five (45) detector lines of the reactor incore instrumentation, (5) the increase of the grace period for the plant operators to evaluate the accident sequence and decide the actuation of this system because the time for flooding a reactor vessel will be greatly shortened, and (6) the easy connection of the reactor cavity flooding system with this reactor flooding system. The reactor flooding system of the invention can be used to assist retaining the molten core material in a reactor vessel with many existing mitigating systems of the plant during a severe accident by cooling the external vessel through the accident management program for accident mitigation purposes. It is considered that these advantages will be figured out from the foregoing description.

Various changes may be made for those skilled in the art in the form, construction, and arrangement. The foregoing embodiments are illustrative, and are not intended to limit the particulars of the invention in which exclusive rights are claimed.

We claim:

1. A device for flooding a spherical lower head of a reactor vessel, for draining hot water heated from outside of the lower head into either a cavity floor or suction of a liquid eductor, and for assisting to retain molten core material in the reactor vessel by external vessel cooling, the device comprising:
   a) a lowest injection header, which has injection nozzles, located at an annulus gap between the spherical lower head of the reactor vessel and a thermal insulator for injecting subcooled water onto a bottom of the reactor vessel and for flooding the lower head;
   b) a middle injection header, which has injection nozzles, located at the annulus gap below shear keys of the lower head and the thermal insulator for injecting the subcooled water onto a middle of the lower head and for flooding the lower head;
   c) a top injection header, which has injection nozzles, located at the annulus gap between an equator level of the lower head and the thermal insulator for injecting the subcooled water onto a lower side of a reactor cylindrical wall and for flooding the lower head;
   d) an upper discharge loop, in which suction holes are installed at a discharge suction header, located above the lower head equator level, for draining hot water heated from outside of the lower head into one of the cavity floor and the liquid eductor; and
   e) a lower discharge loop, which has water leakage collectors, located outside of the thermal insulator opening at the shear keys of the lower head for draining the hot water heated from the outside of the lower head into one of the cavity floor and the liquid eductor.

2. The device according to claim 1, wherein the recirculation of the drained hot water is achieved by one of:
   a) draining the hot water into the reactor cavity floor, using a pump for recirculating the drained water from the reactivity to the lowest, middle and top injection headers in order to flood the lower head; and
   b) draining the hot water into the suction of the liquid eductor by a driving force of two pumps and mixing the hot water with motive subcooled water supplied from a fresh water tank of a fire protection system in the liquid eductor discharge, using the liquid eductor for draining the hot water and the two pumps for recirculating the drained water with the subcooled water from the eductor to the injection headers in order to flood the lower head.

3. A device according to claim 2 wherein the draining of the hot water in a) further comprising the following two operational modes for flooding the lower head wherein;
   a) the subcooled water is supplied by two pumps from the fresh water tank of the fire protection system during the injection mode; and
   b) pool water in the reactor cavity is recirculated by a pump during the recirculation mode.

4. The device according to claim 1 further comprising injection piping to the lowest, middle and top injection headers connected to a pump of the reactor flooding system and/or the liquid eductor and a control valve with a fresh water tank of the fire protection system via the piping, a fire protection pump, a flanged connection, and a valve.

5. The device according to claim 1, wherein the injection nozzles, the suction holes, and an inlet of a pump suction piping at the reactor cavity are equipped with protective screens for preventing plugging by debris.

6. The device according to claim 1, wherein a vortex suppressor, which has a cubic arrangement of standard 1½" (3.81 cm) deep or deeper floor grating with height, length, and width of greater than or equal to 19.9" (50.55 cm), is provided at an inlet of a pump suction piping in the reactor cavity for pump protection; and the recirculation from the cavity is allowed if water pool depth from a top of the vortex suppressor is greater than or equal to 6" (15.3 cm) height.

7. A device according to claim 1, wherein a number of injection nozzles of said lowest injection header are five.

8. A device according to claim 1, wherein an outlet diameter of each injection nozzle of said lowest injection header is 1½".

9. A device according to claim 1, wherein a number of injection nozzles of said middle injection header are twelve.

10. A device according to claim 1, wherein an outlet diameter of each injection nozzle of said middle injection header is 1½".

11. A device according to claim 1, wherein a number of injection nozzles of said top injection header are eight.

12. A device according to claim 1, wherein an outlet diameter of each injection nozzle of said top injection header is 1½".

13. A device according to claim 1, wherein a number of said suction holes of said upper discharge loop are forty.

14. A device according to claim 1, wherein a number of said water leakage collectors are four.

15. A device according to claim 1, wherein a number of said shear keys is four.

* * * * *